(12) United States Patent
Ajiki et al.

(10) Patent No.: US 6,671,137 B2
(45) Date of Patent: Dec. 30, 2003

(54) MAGNETORESISTIVE HEAD INCLUDING EARTH MEMBERS

(75) Inventors: Satoshi Ajiki, Yamagata (JP); Koichi Hosoya, Yamagata (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 154 days.

(21) Appl. No.: 09/956,046

(22) Filed: Sep. 20, 2001

(65) Prior Publication Data

US 2002/0036875 A1 Mar. 28, 2002

(30) Foreign Application Priority Data

Sep. 22, 2000 (JP) ..................... P.2000-287901

(51) Int. Cl.[7] ................................ G11B 5/39
(52) U.S. Cl. ...................................... 360/323
(58) Field of Search ........................ 360/323, 319, 360/128, 97.02

(56) References Cited

U.S. PATENT DOCUMENTS

| | | | | |
|---|---|---|---|---|
| 5,375,022 A | * | 12/1994 | Gill et al. ............... | 360/323 |
| 5,465,186 A | * | 11/1995 | Bajorek et al. .......... | 360/323 |
| 5,539,598 A | * | 7/1996 | Denison et al. .......... | 360/323 |
| 5,805,390 A | * | 9/1998 | Takeura ................... | 360/323 |
| 5,978,181 A | * | 11/1999 | Niijima et al. ........... | 360/323 |
| 6,246,553 B1 | * | 6/2001 | Biskeborn ................ | 360/323 |
| 6,288,880 B1 | * | 9/2001 | Hughbanks et al. ...... | 360/323 |
| 6,415,500 B1 | * | 7/2002 | Han et al. ............... | 29/603.14 |
| 6,470,566 B2 | * | 10/2002 | Hsiao et al. ............ | 29/603.13 |

* cited by examiner

*Primary Examiner*—Jefferson Evans
(74) *Attorney, Agent, or Firm*—Whitham, Curtis & Christofferson, P.C.

(57) ABSTRACT

In a magnetoresistive head, a first non-magnetic layer is formed on a first shield layer. A magnetoresistive element includes a magnetoresistive film and an electrode portion both formed on the first non-magnetic layer. A second non-magnetic layer is formed on the magnetoresistive element. A second shield layer is formed on the second non-magnetic layer. A non-magnetic metal layer electrically connects the first and the second shield layers. A first earth member is electrically connected to the electrode portion of the magnetoresistive element. A second earth member is electrically connected to the first and the second shield layers. A third earth member is electrically connected to the first earth member and the second earth member.

3 Claims, 5 Drawing Sheets

MAGNETORESISTIVE HEAD INCLUDING EARTH MEMBERS

BACKGROUND OF THE INVENTION

The present invention relates to a magnetoresistive head having a pair of shield layers disposed so as to sandwich a magnetoresistive film, and a multi-channel type magnetic head having a plurality of the magnetoresistive heads.

FIG. 6 shows a related magnetoresistive head 100 (hereinafter called as an MR head 100). The MR head 100 is provided with a magnetoresistive element 101 (hereinafter called an MR element 101) as a magnetic sensor element. The MR element 101 is configured by a magnetoresistive film 102 (hereinafter called an MR film 102) which changes its resistance value with respect to a sense current in accordance with the change of magnetizing direction and a pair of electrodes 103 for supplying a sense current to the MR film 102.

The MR head 100 is further provided with an upper shield layer 104 and a lower shield layer 105 which are disposed so as to sandwich the MR element 101 from the upper and lower direction, respectively. The upper shield layer 104 and the lower shield layer 105 sandwich the MR element through non-magnetic insulation films 106. The non-magnetic insulation films 106 prevent a current flowing into the MR film 102 from being shunt and flowing into the upper shield layer 104 and the lower shield layer 105.

Further, the MR head 100 includes an inductive head 107 as a recording element. In the inductive head 107, an upper pole layer 109 is formed on the upper shield layer 104 through a gap film 108. A coil portion 111 covered by an insulation film 110 is formed at a portion surrounded by the upper shield layer 104 and the upper pole layer 109. That is, in the inductive head 107, the upper shield layer 104 and the upper pole layer 109 constitute a magnetic core, whereby recording magnetic field is generated between the upper shield layer 104 and the upper pole layer 109 which are abutted to each other through the gap film 108.

In the MR head 100 thus configured, the MR element 101 detects magnetic field generated from a magnetic recording medium to thereby reproduce information recorded on the magnetic recording medium. In the MR film 102, the magnetizing direction changes by the magnetic field generated from the magnetic recording medium, so that a resistance value thereof with respect to the sense current is changed. In the MR head 100, since the sense current is supplied so as to be constant, the change of the resistance value of the MR film 102 can be detected as the voltage change with respect to the sense current.

However, the MR head 100 can detect smaller magnetic field as compared with the case where the reproduction is performed by using the inductive head 107, and the MR film 102 can be formed quite thinly by the thin film technique. Thus, a magnetic recording medium on which information is recorded at a high density can be reproduced by using the MR head. Accordingly, the MR heads 100 have been frequently employed in the hard disc driving apparatuses of computer apparatuses and so partially contribute to the high-density recording of the hard disc driving apparatuses.

In recent years, the MR heads 100 have been applied not only to the hard disc driving apparatuses but also to apparatuses for recording/reproducing a tape-shaped magnetic recording medium. In the latter case, information recorded on the tape-shaped magnetic recording medium is reproduced by using the MR head 100. Thus, high-density recording can be promoted in the tape-shaped magnetic recording medium like the hard disc driving apparatus.

However, when the MR head 100 is applied to the recording/reproducing apparatus for a tape-shaped magnetic recording medium, the tape-shaped magnetic recording medium slides on and scrapes against the MR head 100 at a high speed to thereby cause static electricity, so that the MR film 102 is charged with static electricity. Since the MR element 101 is sandwiched between the upper shield layer 104 and the lower shield layer 105 through the non-magnetic insulation film 106, the static electricity discharges due to voltage differences caused between the MR film 102 and the upper shield layer 104 and/or the lower shield layer 105, whereby the MR element may be broken. When the MR element 101 is broken, the MR head can not be used any more.

In this manner, the MR head 100 has a problem that electrostatic breakage is likely occurred between the MR film 102 and the upper shield layer 104 and/or the lower shield layer 105. In particular, this problem becomes more remarkable when the MR head 100 is used for a tape-shaped magnetic recording medium.

SUMMARY OF THE INVENTION

It is therefore an object of the invention is to provide an MR head which can surely prevent the occurrence of electrostatic breakage between an MR element and shield layers.

In order to achieve the above object, according to the present invention, there is provided a magnetoresistive head, comprising:

a first shield layer;

a first non-magnetic layer, formed on the first shield layer;

a magnetoresistive element, including a magnetoresistive film and an electrode portion both formed on the first non-magnetic layer;

a second non-magnetic layer, formed on the magnetoresistive element;

a second shield layer, formed on the second non-magnetic layer;

a non-magnetic metal layer, for electrically connecting the first shield layer and the second shield layer;

a first earth member, electrically connected to the electrode portion of the magnetoresistive element;

a second earth member, electrically connected to the first shield layer and the second shield layer; and a third earth member, electrically connected to the first earth member and the second earth member.

In this configuration, since the first and the second earth members are coupled to the common third earth member, the electric potential of the magnetoresistive element and the shield layers are always made identical. Therefore, occurrence of the electrostatic breakage can be prevented so that recording and reproduction can be performed stably and reliably.

Preferably, the first, the second and the third earth members are made of a material having a higher resistance value than an entire resistance value of the magnetoresistive element.

In this configuration, a sense current supplied to the magnetoresistive film can be prevented from being shunt into the earth members.

BRIEF DESCRIPTION OF THE DRAWINGS

The above objects and advantages of the present invention will become more apparent by describing in detail preferred exemplary embodiments thereof with reference to the accompanying drawings, wherein like reference numerals designate like or corresponding parts throughout the several views, and wherein.

DETAILED DESCRIPTION OF THE PREFERRED EMBODIMENTS

The MR head according to one embodiment of the invention will be explained in detail with reference to the accompanying drawings.

Figure 1:
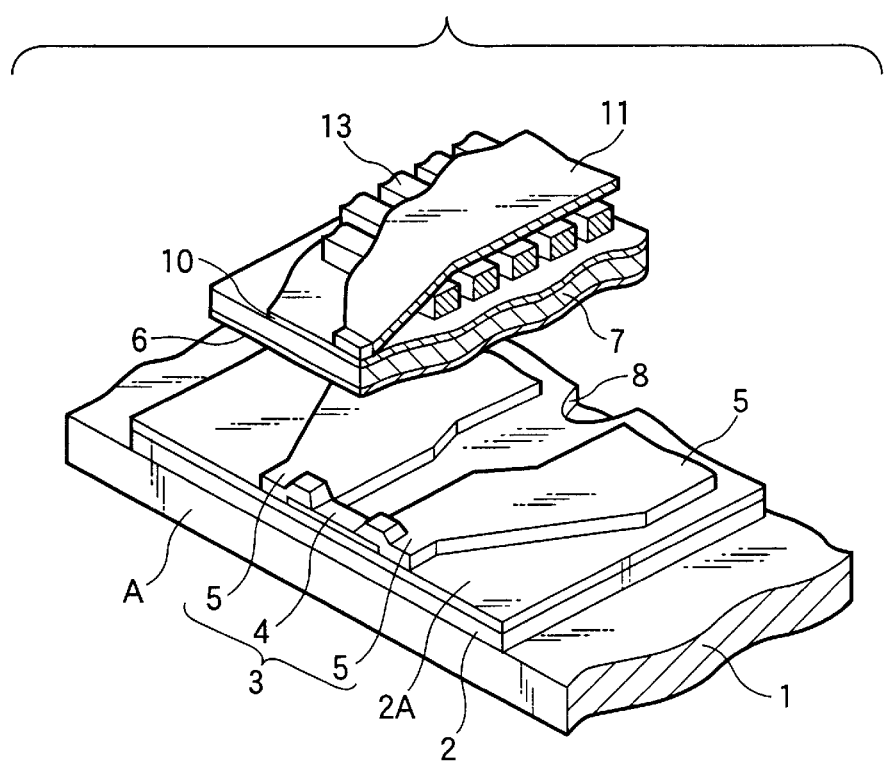
FIG. 1 is an exploded perspective view showing an essential portion of a magnetoresistive head according to one embodiment of the invention.
Figure 2:
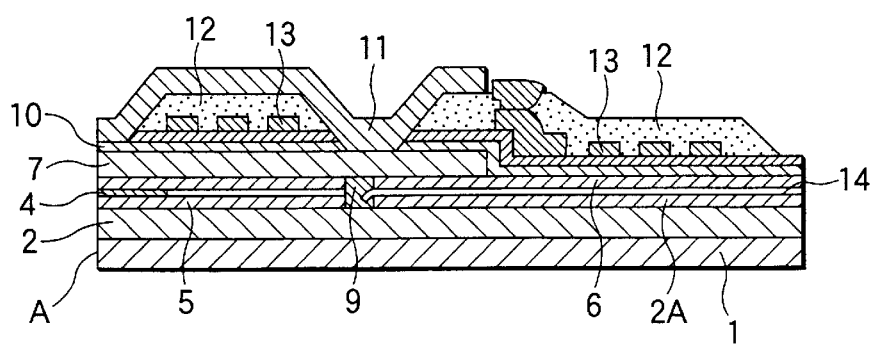
FIG. 2 is a sectional view showing the essential portion of the magnetoresistive head.

As shown in FIGS. 1 and 2, the MR head is configured in a manner that one side face thereof is formed as a sliding face A opposing to a magnetic recording medium (not shown) so that recording and reproducing a signal with respect to a tape-shaped magnetic recording medium (hereinafter called as a magnetic tape), for example, while being slid thereon.

The MR head includes a magnetoresistive element 3 (hereinafter called an MR element 3) formed on a substrate 1 through a lower shield layer 2 and a first read gap layer 2A. The MR element 3 is configured by a magnetoresistive film 4 (hereinafter called an MR film 4) formed by permalloy etc. which changes its resistance value in accordance with the change of external magnetic field, and a pair of electrodes 5 disposed at both end portions of the MR film 4 along the longitudinal direction thereof. An upper shield layer 7 is formed on the MR element 3 through a second read gap layer 6. That is, the MR element 3 is sandwiched between the lower shield layer 2 and the upper shield layer 7 through the first read gap layer 2A and the second read gap layer 6, respectively.

Each of the lower shield layer 2 and the upper shield layer 7 is formed by soft magnetic material such as NiFe, for example. Each of the first read gap layer 2A and the second read gap layer 6 is formed by non-magnetic insulation material such as $Al_2O_3$, for example.

In the MR head, the first read gap layer 2A is provided with a connection hole 8 which is formed by cutting a part thereof located at the inside from the face opposing to the magnetic recording medium. In the MR head, since a non-magnetic metal layer 9 is disposed within and through the connection hole 8, the lower shield layer 2 is electrically connected to the upper shield layer 7. Gold (Au), for example, may be used as the material of the non-magnetic metal layer 9.

Further, the MR head is provided, as an electromagnetic induction element for recording a signal, with a write gap layer 10 formed on the upper shield layer 7, an upper pole layer 11 which opposes to the upper shield layer 7 through the write gap layer 10 while defining a predetermined width of gap, and a coil portion 13 disposed in a space surrounded by the write gap layer 10 and the upper pole layer 11 and covered by insulation material 12.

The write gap layer 10 is formed by non-magnetic insulation material such as $Al_2O_3$, for example, and the upper pole layer 11 is formed by soft magnetic material such as NiFe, for example. The coil portion 13 is formed by conductive material such as Cu, for example.

Figure 3:
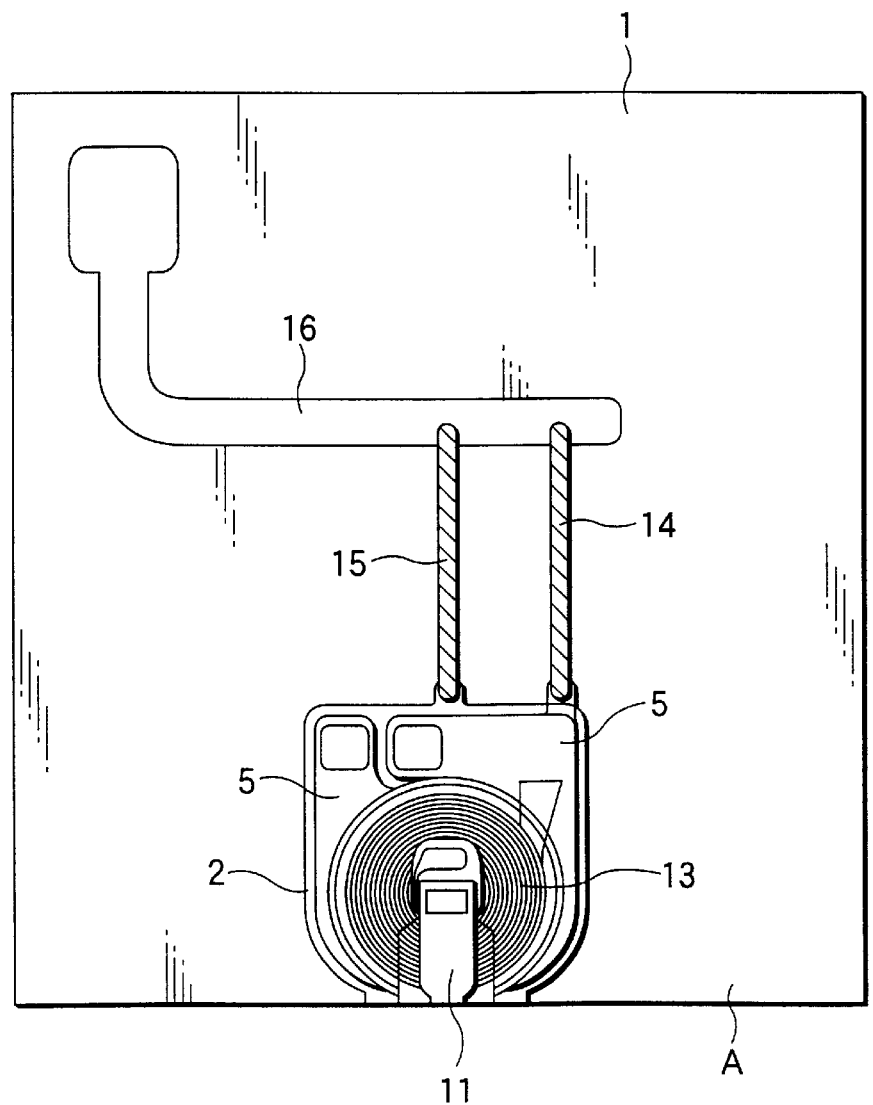
FIG. 3 is a plan view of the magnetoresistive head.
Figure 4:
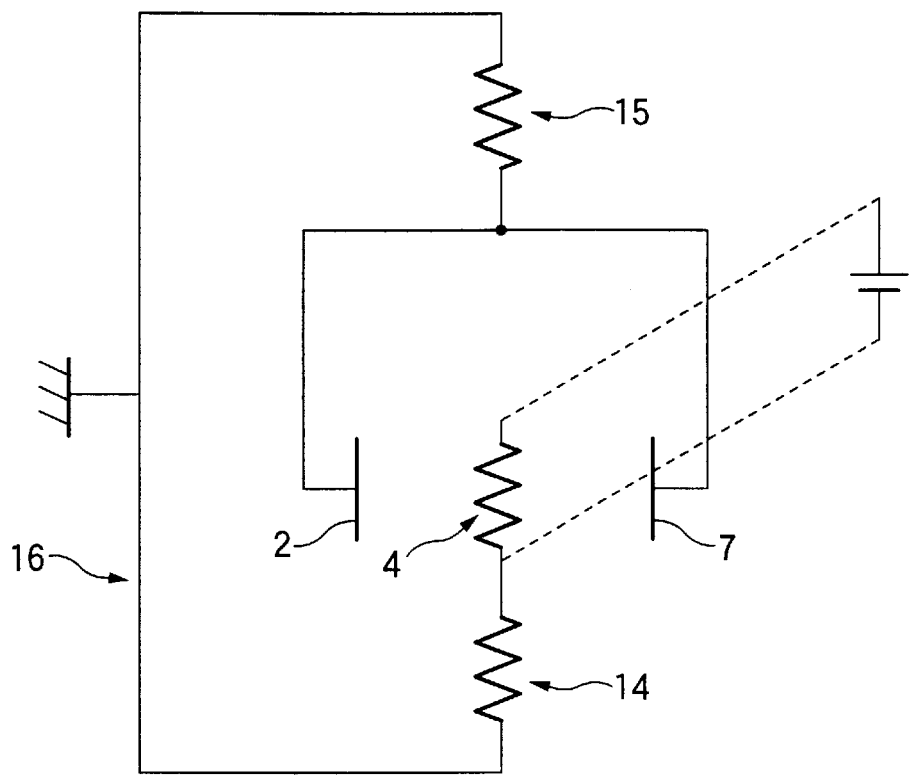
FIG. 4 is an equivalent circuit diagram of an MR film, an upper shield layer and a lower shield layer.

Further, as shown in FIGS. 3 and 4, the MR head is provided with an MR element earth 14 drawn from the electrode 5 of the MR element 3, a shield earth 15 drawn from the upper shield layer 7 and/or the lower shield layer 2, and an MR head earth 16 for coupling the MR element earth 14 and the shield earth 15. Each of the MR element earth 14 and the shield earth 15 is preferably formed by material having a relatively high specific resistance. Ta etc., for example, may be raised as such material.

In particular, each of the MR element earth 14, the shield earth 15 and the MR head earth 16 is preferably formed so as to have a resistance value of about 100 Ω in a case where an entire resistance value of the MR element 3 falls within a range of 40 to 60 Ω.

The MR head configured in this manner records and reproduces a signal while sliding on the magnetic tape. At the time of reproducing a signal, the sliding face A is slid on the magnetic tape in a state where the sense current is supplied from the pair of electrodes 5 to the MR film 4 so as to be a constant current value. When leakage magnetic field generated from the magnetic tape is applied to the MR film 4, the magnetizing direction of the MR film 4 changes and so the resistance value of the MR film 4 changes due to the magnetoresistive effect. In the MR element 3, since the constant sense current is supplied to the MR film 4, the change of the resistance value of the MR film 4 appears as the voltage change with respect to the sense current. The MR head can reproduce a signal written on the magnetic tape by detecting the voltage change with respect to the sense current. In this case, the lower shield layer 2 and the upper shield layer 7 induce magnetic field other than that to be reproduced of the magnetic field generated from the magnetic tape to thereby apply only the magnetic field to be reproduced to the MR film 4.

At the time of recording a signal, the upper shield layer 7 and the upper pole layer 11 are used as a magnetic core, and the magnetic core is magnetized in a predetermined direction by magnetic field generated by current supplied to the coil portion 13. Since the magnetic core is separated through the write gap layer 10, the magnetic core generates magnetic field which crosses over the write gap layer 10. The MR head generates the magnetic field which crosses over the write gap layer 10 while having the magnetic tape slid on the sliding face A, so that signal can be recorded on the magnetic tape.

In the MR head of this embodiment, the magnetic tape is slid on the sliding face A in each case of reproducing and recording a signal. Thus, in the MR head, static electricity is generated at the time of reproducing and/or recording a signal. The static electricity thus generated flows into the MR head earth 16 through the MR element earth 14 and the shield earth 15, and so none of the MR element 3, the upper shield layer 7 and the lower shield layer 2 is charged with static electricity. In other words, in the MR head, even if static electricity is generated due to the sliding operation between the magnetic tape and the sliding face A, the voltages at the MR element 3, the upper shield layer 7 and the lower shield layer 2 can always be made identical. Thus, in the MR head, the electrostatic breakage can be prevented from occurring among the MR element 3, the upper shield layer 7 and the lower shield layer 2, whereby recording and reproducing operations can be performed stably.

In particular, in the MR head, since the upper shield layer 7 and the lower shield layer 2 are made conductive through the non-magnetic metal layer 9, the shield earth 16 may be drawn from one of the upper shield layer 7 and the lower shield layer 2.

Further, in the MR head, since the specific resistance value of each the MR element earth 14, the shield earth 15 and the MR head earth 16 is made high, the sense current supplied to the MR film 4 can be prevented from being shunt into the MR element earth 14, the shield earth 15 and the MR head earth 16. Thus, in the MR head, the voltage change with respect to the sense current can be detected with high accuracy.

Figure 5:
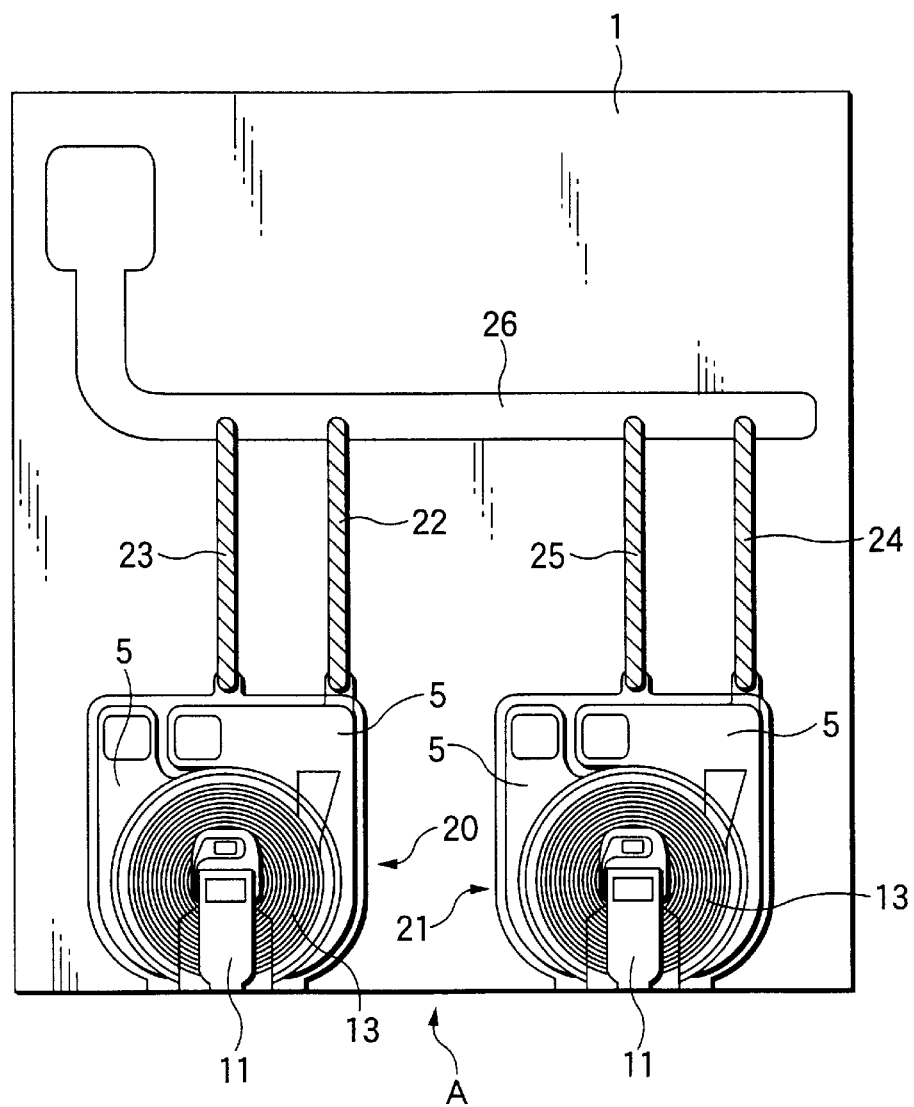
FIG. 5 is a plan view showing a multi-channel type MR head.
Figure 6:
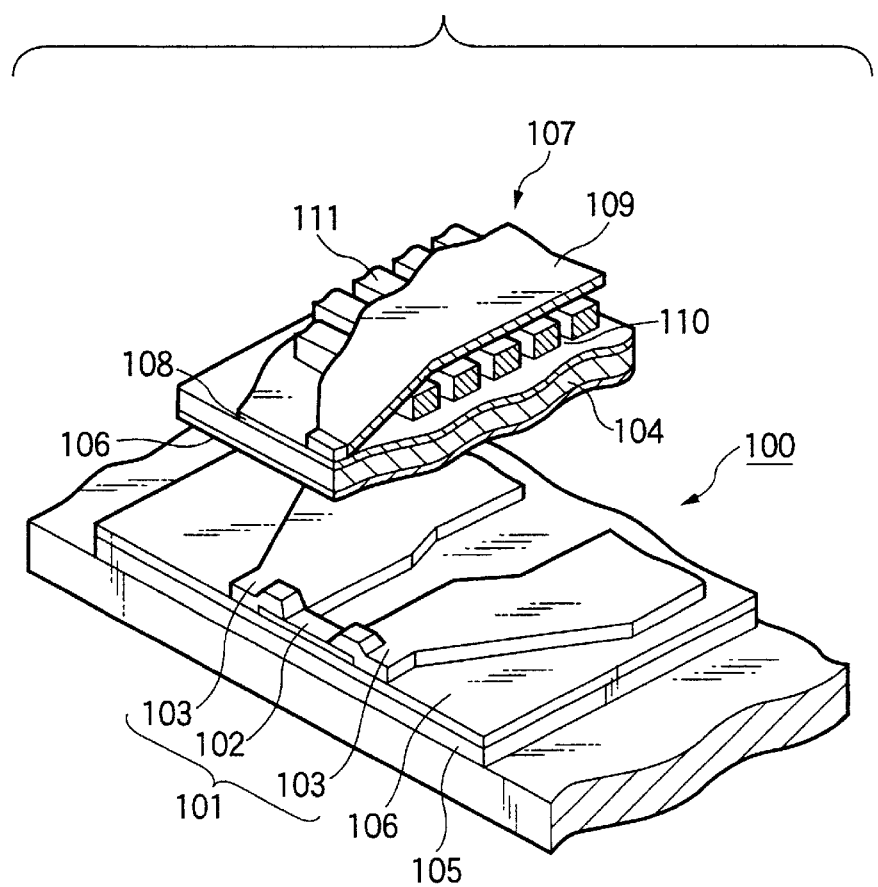
FIG. 6 is an exploded perspective view showing an essential portion of a related MR head.

The invention can also be applied to a multi-channel type magnetic head having a plurality of MR heads. As an example of the multi-channel type magnetic head, as shown in FIG. 5, two MR heads (a first MR head 20 and a second MR head 21) may be juxtaposedly arranged in the longitudinal direction of the MR element 3. In this case, an MR element earth 22 and a shield earth 23 of the first MR head 20 and an MR element earth 24 and a shield earth 25 of the second MR head 21 are connected to an identical MR head earth 26.

In each of the first MR head 20 and the second MR head 21, the electrostatic breakage caused by the voltage differences among the MR element 3, the upper shield layer 7 and the lower shield layer 2 can be prevented from occurring. Thus, the multi-channel type magnetic head can surely prevent the occurrence of the electrostatic breakage and perform stable recording and reproduction.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A magnetoresistive head, comprising:
    a first shield layer;
    a first non-magnetic layer, formed on the first shield layer;
    a magnetoresistive element, including a magnetoresistive film and an electrode portion both formed on the first non-magnetic layer;
    a second non-magnetic layer, formed on the magnetoresistive element;
    a second shield layer, formed on the second non-magnetic layer;
    a non-magnetic metal layer, for electrically connecting the first shield layer and the second shield layer;
    a first earth member, electrically connected to the electrode portion of the magnetoresistive element;
    a second earth member, electrically connected to the first shield layer and the second shield layer; and
    a third earth member, electrically connected to the first earth member and the second earth member,
    wherein the first, the second and the third earth members are made of a material having a higher resistance value than an entire resistance value of the magnetoresistive element.

2. The magnetoresistive head as set forth in claim 1 further comprising:
    a coil member, formed on the second shield layer;
    an insulation layer, covering the coil member; and
    a magnetic layer, formed on the insulation layer so as to form a magnetic core together with the second shield layer.

3. A multi-channel magnetoresistive head unit, comprising:
    a plurality of magnetoresistive heads, each including:
        a first shield layer;
        a first non-magnetic layer, formed on the first shield layer;
        a magnetoresistive element, including a magnetoresistive film and an electrode portion both formed on the first non-magnetic layer;
        a second non-magnetic layer, formed on the magnetoresistive element;
        a second shield layer, formed on the second non-magnetic layer;
        a non-magnetic metal layer, for electrically connecting the first shield layer and the second shield layer;
        a first earth member, electrically connected to the electrode portion of the magnetoresistive element; and
        a second earth member, electrically connected to the first shield layer and the second shield layer; and
    a third earth member, electrically connected to the first earth members and the second earth members of the respective magnetoresistive heads,
    wherein the first, the second, and the third earth members are made of a material having a higher resistance value than an entire resistance value of the magnetoresistive element.

* * * * *